(12) United States Patent
Tijerina Ramos

(10) Patent No.: US 11,384,004 B2
(45) Date of Patent: Jul. 12, 2022

(54) SYSTEM AND METHOD FOR TRANSFERRING GLASS ITEMS

(71) Applicant: Vitro, S.A.B. de C.V., Monterrey (MX)

(72) Inventor: Victor Tijerina Ramos, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 218 days.

(21) Appl. No.: 16/954,690

(22) PCT Filed: Dec. 20, 2017

(86) PCT No.: PCT/MX2017/000173
§ 371 (c)(1),
(2) Date: Jun. 17, 2020

(87) PCT Pub. No.: WO2019/125116
PCT Pub. Date: Jun. 27, 2019

(65) Prior Publication Data
US 2020/0354259 A1    Nov. 12, 2020

(51) Int. Cl.
*C03B 9/453* (2006.01)
*C03B 35/08* (2006.01)
(Continued)

(52) U.S. Cl.
CPC ............ *C03B 35/10* (2013.01); *C03B 9/3841* (2013.01); *C03B 9/453* (2013.01); *C03B 35/125* (2013.01)

(58) Field of Classification Search
CPC ......... C03B 9/453; C03B 35/08; C03B 35/10; C03B 35/12; C03B 35/125
See application file for complete search history.

(56) References Cited

U.S. PATENT DOCUMENTS 3,449,104 A    6/1969 Hamilton
3,650,725 A    3/1972 Okumura et al.
(Continued)

FOREIGN PATENT DOCUMENTS

EP    0037799 A2    10/1981
EP    2269958 A1    1/2011

*Primary Examiner* — Cynthia Szewczyk
(74) *Attorney, Agent, or Firm* — The Webb Law Firm

(57) ABSTRACT

The present invention relates to a system and a method for transferring glass items from machines for shaping glass items of the type that comprises: a rotary cooling platform for receiving, cooling and conveying items formed immediately prior in molds of said shaping machine to a conveyor belt, the rotary cooling platform having a rotational motion towards the left and towards the right, from a first position for receiving items to a second delivery position facing said conveyor belt; first drive means located under the rotary cooling platform in order to rotate same with said rotational motion from said position for receiving items to said second position for delivering items and from said position for delivering items to said position for receiving items; and a pushing mechanism coupled onto the rotary platform, the pushing mechanism being aligned in the first receiving position with each of the recently shaped items of the molds, the pushing mechanism being translated together with said rotary cooling platform from the first position for receiving items to the second position for delivering items; the pushing mechanism having a to-and-fro motion in the second delivery position for pushing the items along a diagonal path, at constant speed, from the rotary cooling platform positioned in said second position towards the conveyor belt in order to place the items aligned above same.

15 Claims, 9 Drawing Sheets

(51) Int. Cl.
*C03B 35/10* (2006.01)
*C03B 9/38* (2006.01)
*C03B 35/12* (2006.01)

(56) References Cited

U.S. PATENT DOCUMENTS

| | | |
|---|---|---|
| 4,162,911 A | 7/1979 | Mallory |
| 4,462,519 A * | 7/1984 | Parkell .................... C03B 9/453 198/740 |
| 5,429,651 A | 7/1995 | Bolin |
| 6,173,661 B1 | 1/2001 | Vajda |
| 8,403,129 B2 | 3/2013 | Borsarelli et al. |
| 2004/0050661 A1 | 3/2004 | Leidy et al. |
| 2009/0257856 A1 * | 10/2009 | Balbi ....................... C03B 9/453 414/568 |
| 2013/0153367 A1 | 6/2013 | Felgenhauer et al. |

* cited by examiner

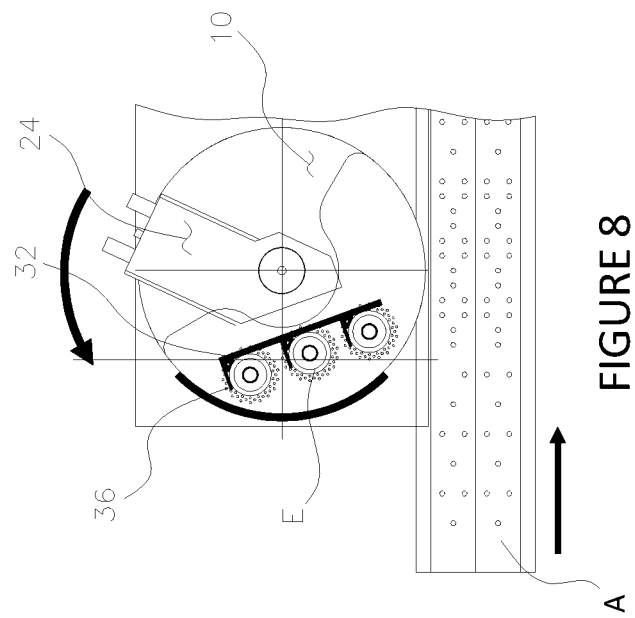
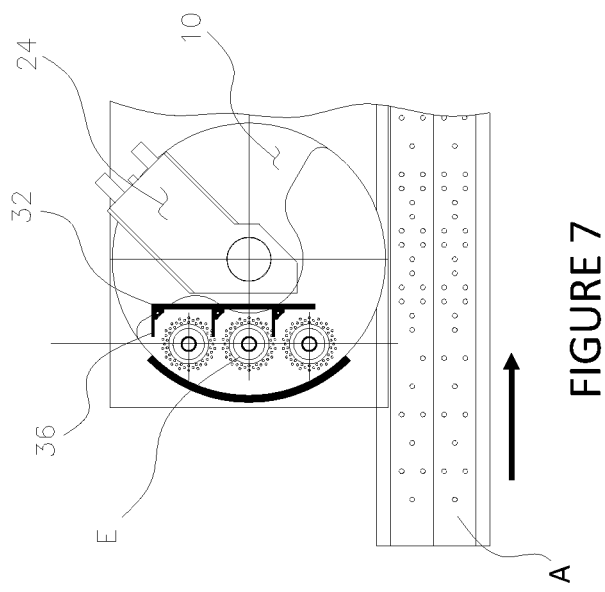

SYSTEM AND METHOD FOR TRANSFERRING GLASS ITEMS

CROSS-REFERENCE TO RELATED APPLICATION

This application is the United States national phase of International Application No. PCT/MX2017/000173 filed Dec. 20, 2017, the disclosure of which is hereby incorporated by reference in its entirety.

BACKGROUND OF THE INVENTION

In the glassware manufacturing process, such as the blow-blow process, at least one drop of molten glass is fed to each section of a forming machine, for example, an I.S. machine, which shapes a container preform or parison in an inverted position, and also simultaneously shapes the crown of the container. Subsequently, the preform is then inverted to a normal position and placed in a blow mold, where it receives a final blow, thus shaping the container to the desired final shape.

Once the final blow has taken place, a take-out mechanism transfers the newly formed containers from the blow mold to a cooling plate giving where the container receives initial cooling. Subsequently, the container is then transported by means of a 90° pusher on a moving conveyor belt to an annealing furnace, where all thermal stresses suffered by the container during its manufacturing process are removed.

During the extraction process from the container to the cooling zone and its subsequent transfer to the conveyor belt, it is important that there is perfect synchronization between the container takeout mechanism and the 90° pusher.

In this sense, the takeout mechanisms are well known in the glass industry, especially for use in I.S. forming machines (individual sections), and mainly are constituted by an oscillating arm that is pivotally supported at one of its ends on a support structure that is located at the front of the machine and moves to oscillate angularly from a position of the blow mold or final finish of the container to the position of the cooling plate. A takeout head assembly rests on the free end of the swing arm and moves in a relationship dependent on the oscillatory movement of that arm. The takeout head assembly includes at least one pair of tongs that open and close simultaneously to transport the container from the final blow mold to the cooling plate.

At present, when the containers are finished in the blow mold of the IS machine, a mold mechanism starts its opening movement and, at that moment, the newly formed container is kept in an upright position, waiting for the takeout mechanism to pick up such containers.

When the takeout head arrives with its tongs open, it will take the containers by the crown through the movement of closing the tongs and will initiate an angular movement in the clockwise direction, which is based on the design of the takeout mechanism, either by a pneumatic or servo motorized driving force. The times used by the movement of the takeout mechanism are governed by the operation of each section of the I.S. machine and, in recent years, constant efforts have been made to reduce them in order to increase the production of the I.S. machines.

Once it has completed its 180-degree turn, the takeout mechanism will remain in that position depending on the I.S. machine operation, until the process requires the tongs to be opened and leaves the containers on a cooling plate where they receive an initial cooling, before being placed on a dead plate. Afterwards, the takeout mechanism will take a position known as "kick off" in which it will wait for the moment to go and pick up a new set of containers.

The containers delivered by the takeout on the dead plate will remain there receiving cooling until the pusher mechanism removes them.

Then, the pusher mechanism will proceed to push the containers from the dead plate and will move them with a 90° movement to the conveyor belt, with a linear speed related to the number of sections and cavities of the machine.

During the movement of the pusher mechanism, the containers pass from a static condition that they have on the dead plate, until reaching the speed of the conveyor belt. Therefore, in the pushing path, the pusher mechanism must have a profile that constantly keeps the container in contact (with the fingers of the pusher mechanism), until the time comes to leave the container in the right place on the conveyor belt and immediately remove the fingers from the impact area with other containers to prepare to start a new cycle.

The known processes, where a forming machine can manufacture from one to four containers per section (multiple cavities), different conditions are generated for the transfer of each container, mainly due to the different travel distances of each container, leading the pusher to adapt to the best possible handling of the group of containers to achieve satisfactorily delivery on the conveyor belt. When a correct transport is not fulfilled, a container falls or the delivery of a container in a position different from the desired one occurs and, therefore, affect the other containers that are on the cooling plate or during its movement on the conveyor belt.

Due to the complexity of the above, there are patents that have placed on the pusher fingers a process known as "air pocket" whose purpose is to prevent the container from separating from the pusher fingers due to the high kinematic forces that arise and lead to some of the containers no longer having contact with the fingers and the required precision is lost at the time of delivery of the container on the belt.

For example, U.S. Pat. No. 3,650,725 dated 21 Mar. 1972 assigned to Akihiro Okumura describes an apparatus for taking out an article of glassware from finishing mold, which hold temporarily by means of extraction tongs until they are cooled to a temperature that the article no longer gets deformed. The articles, then placed onto a turntable where they have an additional cooling, and are transferred in an equidistant arrangement onto a belt conveyor which is driven at a velocity higher than the rotational speed of the turntable by means of delivery arms adapted to be rotated at a progressively increasing speed.

The U.S. Pat. No. 4,162,911, dated Jul. 31, 1979, assigned to James Mallory describes two sections of a multiple section-type of glass forming machine in which each section is comprised of a single parison forming station and two blow molding stations, with a pair of transfer arms to alternately transferring and reverting the formed parison from the parison station to the blow molding stations. A take-out means is provided for each blow molding station to move the blown ware to a dead plate. A sweepout device moves the ware to the cooling dead plate to a conveyor. A conveyor belt is included for all the forming machine sections for conveying the ware away from the sections which are physically arranged as in-line forming machine sections.

U.S. Pat. No. 5,429,651 dated Jul. 4, 1995, by James Bolin, relates to a pusher mechanism of an IS machine for transferring a plurality of glass bottles onto a conveyor belt by rotating the bottles through an arc to align the bottles with the conveyor belt while simultaneously linearly moving the bottles at a converging acute angle toward the conveyor belt. The combined rotational and linear movements effectively lengthen the radius of curvature of the path of the bottles and increases the speed of the bottles on the conveyor belt. The centrifugal force applied to the bottles is limited or reduced to allow the bottles to move quickly on the conveyor belt without introducing instabilities in the bottles. Other horizontal and vertical movements may be applied. A nozzle can be positioned to deliver a flow of air against the bottles to counteract instabilities. A take-out mechanism is used with the pusher mechanism rotates the bottles at an acute angle with respect to the conveyor belt. This initial acute angle reduces the amount of rotation which the pusher mechanism must impart when placing the bottles on the conveyor belt, thus reducing the possibility of introducing instabilities.

According to the prior related art, the containers, once they have been removed from the final blow mold, are placed on a dead plate to provide a first cooling and deposited thereon (static condition). Then, the containers are transferred by a 90° container pusher, with a 90° movement, from the dead cooling plate to a continuously moving conveyor belt and, once placed, it returns to its original position to start a new cycle of transfer.

As mentioned, the containers pass from a static condition they have on the dead plate, until reaching the speed of the conveyor belt. Therefore, in the push path, it is required that the pusher mechanism has a push profile that constantly manages to keep the container in contact (maintaining the stability of the containers during transfer), until containers are deposited on a conveyor belt that moves in a constant velocity.

As described in the apparatuses shown in U.S. Pat. Nos. 4,162,911 and 5,429,651, containers, once removed from the forming mold, these are transferred onto the cooling plate where they are temporarily held on said cooling plate to receive an initial cooling on the bottom and body of the container. Once an initial cooling has been given, the container is deposited on the dead plate for the entry of a 90° pusher mechanism. Afterwards, the containers are transferred or dragged from the plate to the conveyor belt.

It has been observed that because the walls of the container are not fully hardened, the fingers of the 90° pusher mechanism produce some marks (during their transfer) affecting the quality of the same.

Likewise, it has also been observed that in order to avoid the defects of the container during its transfer, a longer cooling time of the container (in the cooling plate) is required, which would increase the cycle time of container formation.

Therefore, the present invention relates to a system and method for the transfer of glassware using a rotating cooling platform in which the newly formed containers are placed, such rotating cooling platform having a rotational movement to the left and/or to the right according to the direction of the belt, from a first position with respect to the newly formed containers of the blow mold, to a second position with respect to a conveyor belt; driving means connected below the rotating cooling platform to rotate it with such rotational movement to the left and to the right; and, a pusher mechanism fixedly connected to the rotating cooling platform, such pusher mechanism being aligned in such first position with respect to the newly formed containers of the blow mold, such pusher mechanism traveling together with such rotating cooling platform of such first position to such second position, such pusher mechanism having a forward and backward movement in such second position to linearly push the containers with a diagonal path at constant speed of the rotating cooling platform positioned in such second position towards a conveyor belt to place them aligned on it.

By means of this system a better handling of hot container is achieved, because due to movement of the rotating cooling platform, the containers remain in their position since they leave the dead plate of the forming section until they are brought to the front of a conveyor belt, i.e., there is no "container drag", avoiding with it the mistreatment of the bottom of the containers or falls on the dead plate. Another advantage is that the vacuum generated in the container body by the "air pocket" device is used, resulting in a huge increase in the speed of rotation of the container, helping to have an increase in the speed of the machine.

OBJECTIVES OF THE INVENTION

Therefore a first objective of the present invention is to provide a system and method for the transfer of glassware that allows the containers to be continuously cooled during their entire transfer from their extraction in the blow molds until they are positioned in front of a conveyor belt.

This system allows vacuum to be used from the moment the container makes contact with the dead plate and increases the cooling pressure to set the article faster. The advantage in the thermal uniformity of the cooling of the containers is also noteworthy since, during the entire rotation path, the container cools down in the same position with a constant cooling pattern resulting in a reduction in the setting time and an increase in the machine cycle speed.

Another objective of the present invention is to provide a system and method for the transfer of glassware which allows greater stability of transfer of the glassware.

A further objective of the present invention is to provide a system and method for the transfer of glassware which prevents the fall of the articles which are on the cooling plate or during their movement toward the conveyor belt.

An additional objective of the present invention is to provide a system and method for the transfer of glassware which allows a perfect synchronization between a container removal mechanism from the molds and the container pusher towards the conveyor belt.

These and other objectives and advantages of the system and method for the transfer of glassware, of the present invention, will be able to be visualized by the experts in the field, from the following detailed description of a preferred embodiment of the invention, which will remain within the scope of the claimed invention.

BRIEF DESCRIPTION OF THE DRAWINGS

As a preferred embodiment of the present invention, it is now described with reference to the attached drawings in which:

FIGS. 7 to 12 show the sequence of movements of the system for the transfer of containers, in accordance with the present invention.

DETAILED DESCRIPTION OF THE INVENTION

The method and system for the transfer of articles in accordance with the present invention will be described below, making reference to the accompanying drawings as an illustration of it, where the same numbers refer to the same parts of the figures shown.

Figure 1:
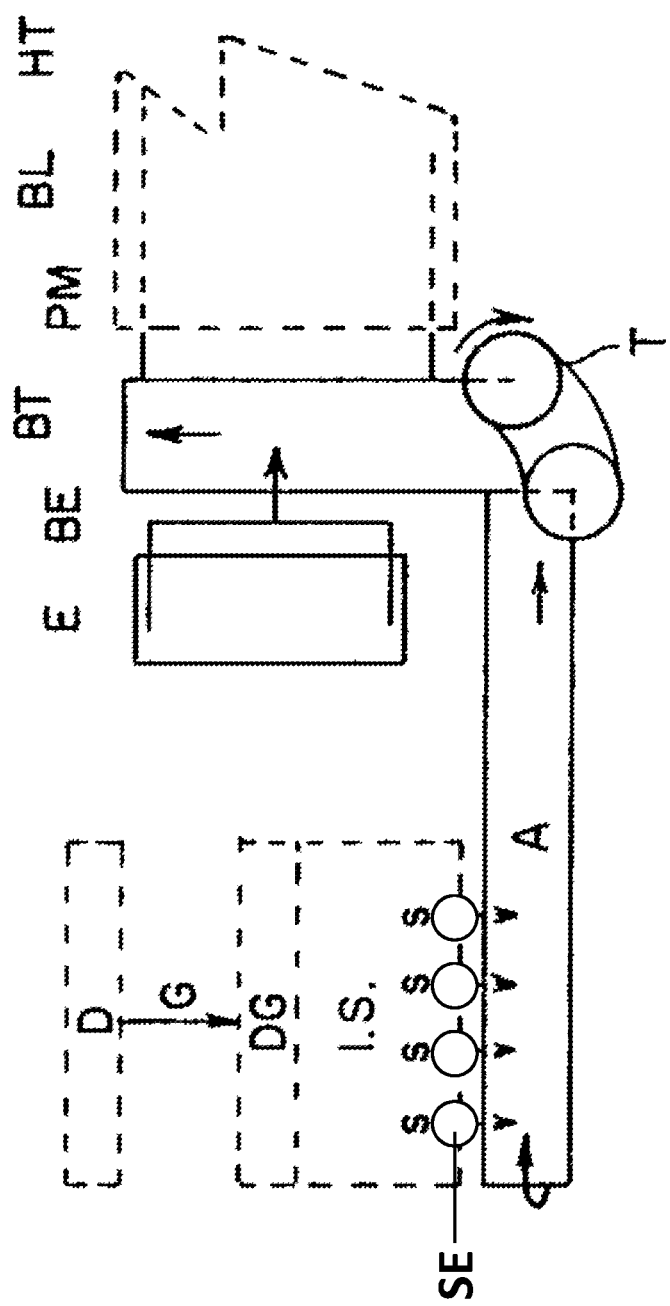
FIG. 1 shows a schematic view of the glass container manufacturing process, showing the location of the system for the transfer of articles of the present invention.
Figure 2:
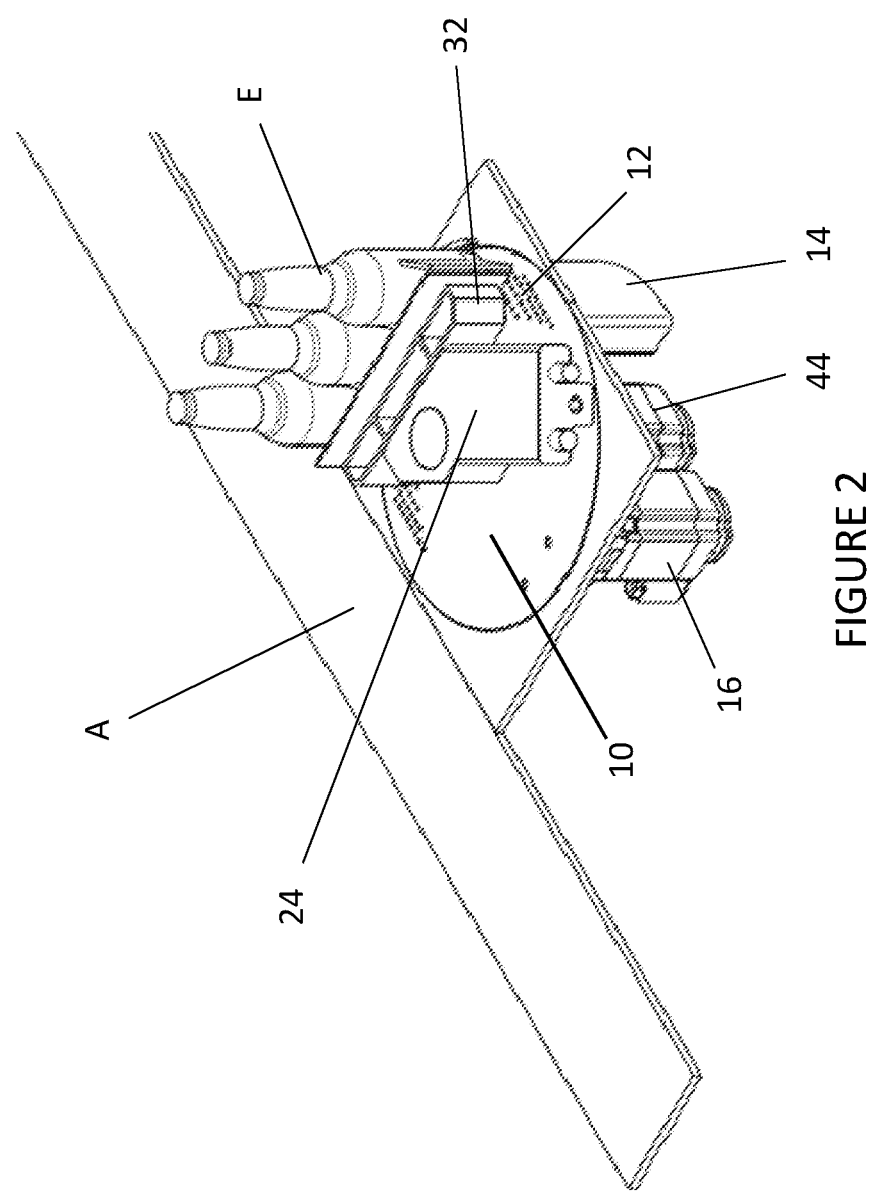
FIG. 2 shows a schematic view in conventional perspective, of the system for the transfer of glass containers showing the system in a first position with respect to the containers that have been removed from the blow molds.
Figure 3:
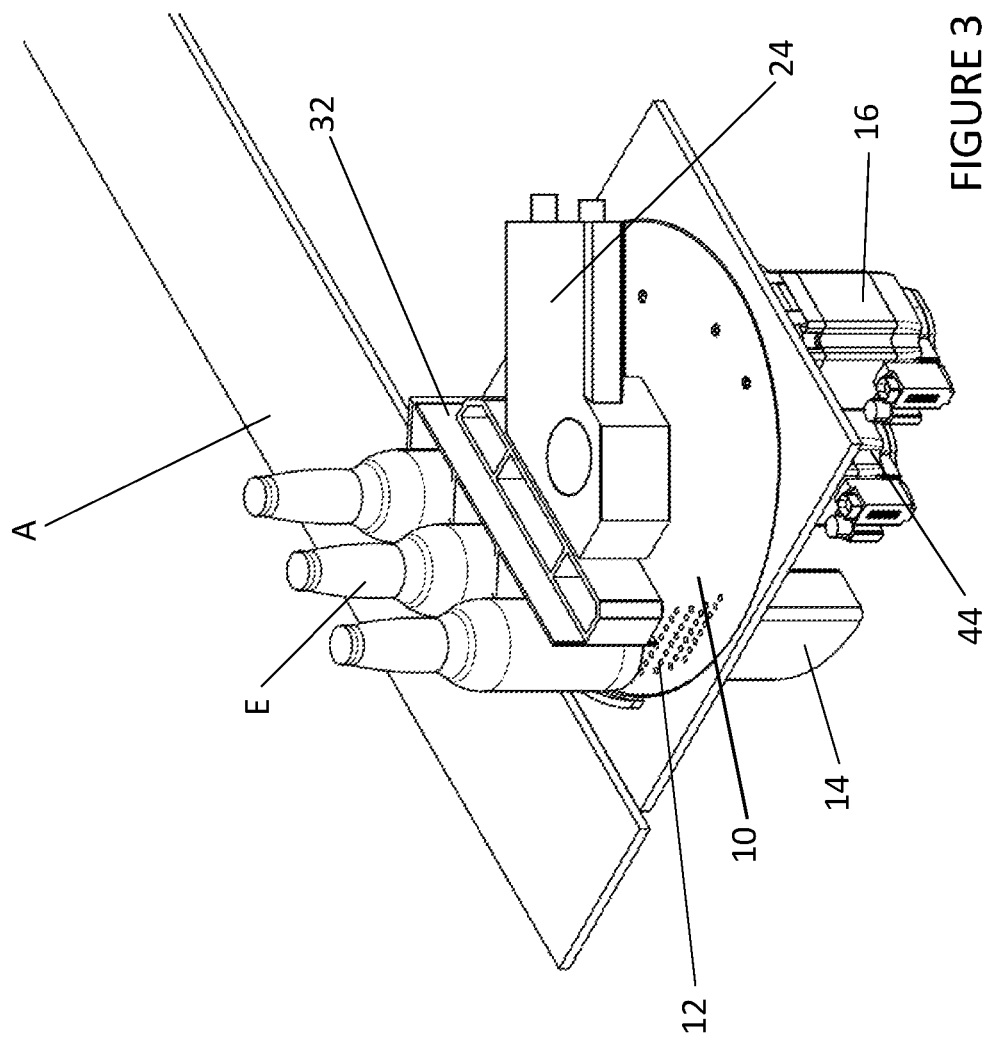
FIG. 3 shows a conventional perspective schematic view of the system for the transfer of glass containers showing the system in a second position, placing the containers in front of a conveyor belt.
Figure 4:
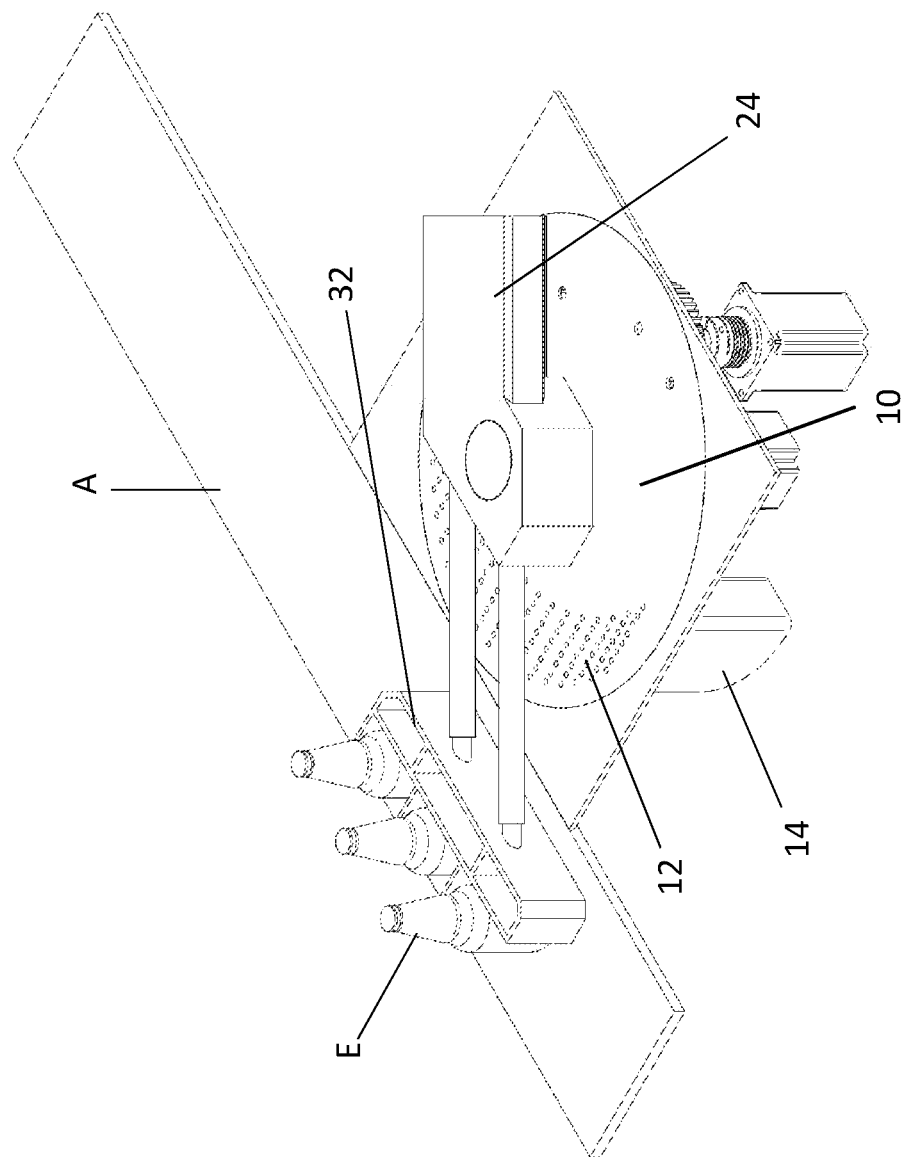
FIG. 4 shows a conventional perspective schematic view of the system for the transfer of glass containers which shows a pushing mechanism having a forward and backward movement in the second position to push the containers linearly with a diagonal path towards the conveyor belt.
Figure 5:
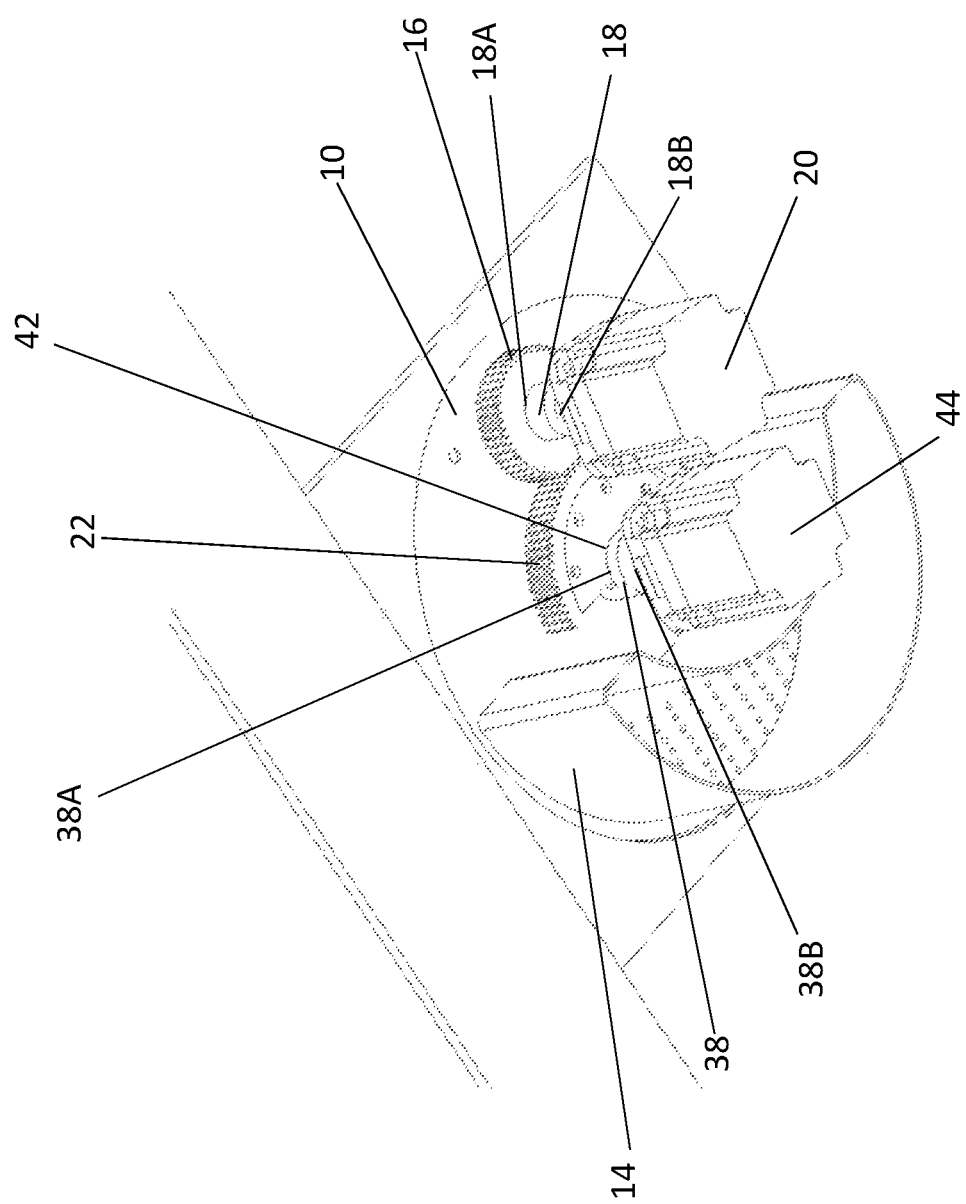
FIG. 5 shows a conventional perspective schematic view, seen from below, of the system for the transfer of glass containers of the present invention.

As shown schematically in FIG. 1, the production process and the manufacture of glass articles such as containers or jars, the molten glass is fed from a feeder D in the form of drops G, which are distributed by a distributor DG to the individual forming sections of an I.S. machine. The containers or jars formed by each of the individual forming sections S, still hot, are first deposited in a cooling system SE of the respective section and from this they are pushed towards a conveyor belt A, which transfers the containers of all sections to a transfer mechanism T placed at the end of the section. This transfer mechanism regulates the flow of the articles by separating them uniformly and changing the direction of movement by 90° and deposits them one by one on a cross conveyor BT in a uniformly spaced row. Once a complete row of articles has been formed, a pusher E simultaneously transfers, by means of a pusher bar BE, all the containers in of row of the cross conveyor belt BT through dead transition plates PM from a linear conveyor belt BL from an annealing furnace HT.

Figure 6:
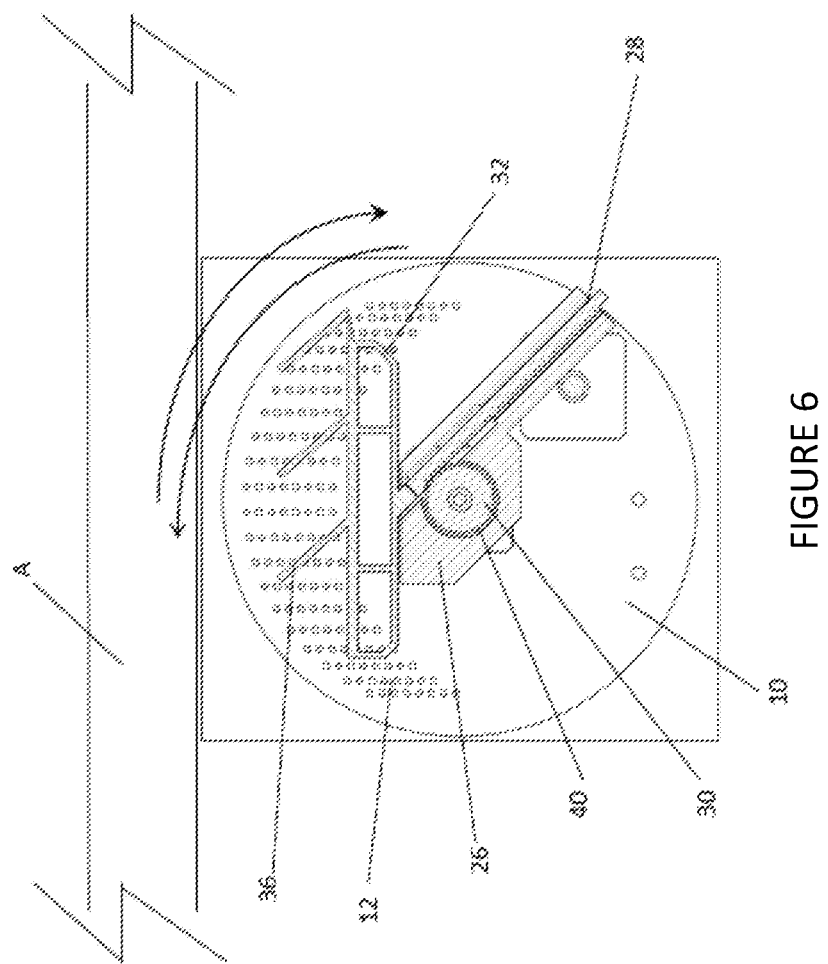
FIG. 6 shows a top plan view of the system of the present invention.
Figure 9:
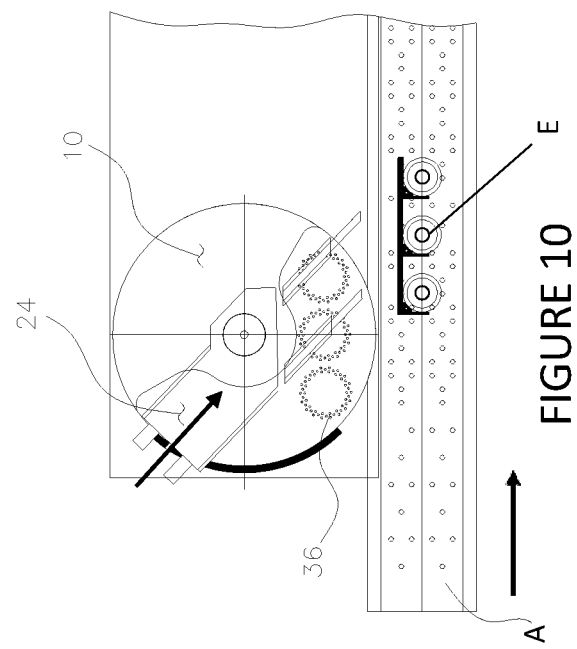
Figure 10:
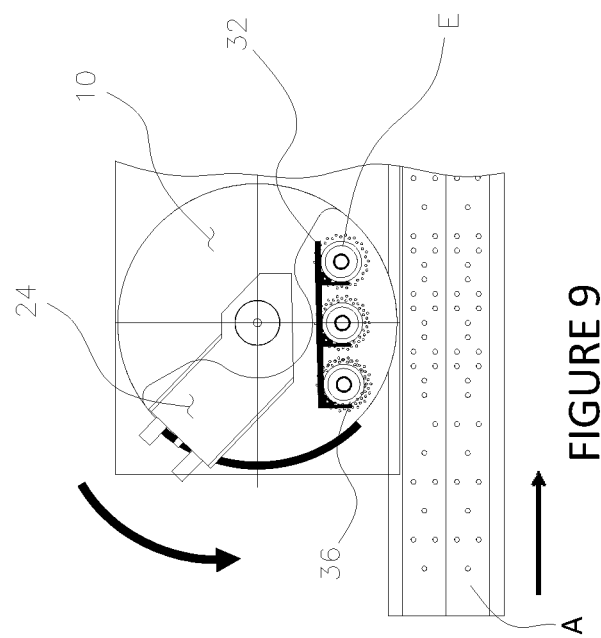
Figure 12:
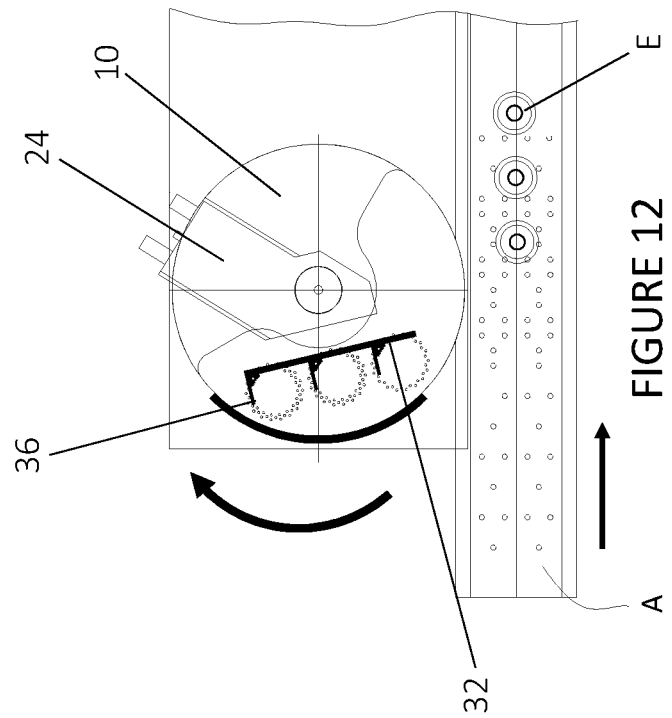
Figure 11:
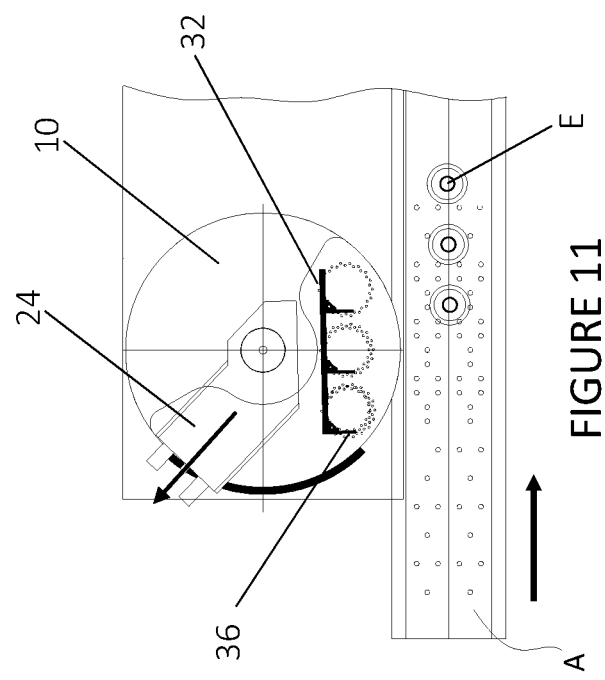

Next, each part and operation of the glass container transfer system ST, as shown in FIGS. 2 to 5, will be described in detail as follows: a rotating cooling platform 10 where the newly formed articles or containers are placed, to receive, cool and transport the containers from a first position where the newly formed containers from the forming sections S (forming molds) have been placed, to a second position with respect to the conveyor belt A. This rotating cooling platform 10 has a rotational movement to the left and to the right of about 90° [FIG. 6] from the first position in relation to the newly formed containers (forming molds), to a second position in relation to conveyor belt A and vice versa.

The rotating cooling platform 10 including a series of holes 12, equidistantly distributed for discharge air. A semi-circular air supply chamber or plenum chamber 14 coupled below the rotating cooling platform 10 and coinciding with a series of orifices 12, to continuously discharge cooling air through these orifices 12, for the cooling of newly formed containers or jars. A first gear 16 located below and near the periphery of the rotating cooling platform 10. A shaft 18 that has a first end 18A and a second end 18B, said first end 18A being connected to the first gear 16. A servo motor 20 located below the rotating cooling platform 10 connected to the second end 18B of shaft 18 to produce a rotational movement to the shaft 18 to the left or right and thereby rotating the platform 10 as described below. The first gear 16 being connected by shaft 18 to be driven by the servomotor 20.

A second gear 22 engaged centrally below the rotating cooling platform 10, which is engaged with first gear 16 in such a way that, when servomotor 20 is driven with a rotational movement to the left or to the right, the rotating cooling platform 10 moves from the first position with respect to the newly formed containers of the shaped sections S (forming molds), to a second position with respect to the conveyor belt A and vice versa.

A pusher mechanism 24 coupled on the rotating cooling platform 10, said pusher mechanism 24 being aligned in said first position with respect to the newly formed containers of the blow mold, such pusher mechanism 24 traveling together with such rotating cooling platform 10 from such first position to such second position. The pusher mechanism 24 (seen in detail in FIG. 6) comprising: a supporting base 26 including a rack 28 and pinion 30 assembly. The rack 28 has a contact plate 32 coupled at one end, in a horizontal position, which has a series of fingers 36 extending from the front part thereof, to linearly push the containers with a diagonal path at constant speed of the rotating cooling platform 10 towards the conveyor belt A to place them in an aligned position on it.

Pinion 30 being connected to a central shaft 38. An upper end or first end 38A of the central shaft 38. The central shaft 38 freely passes through a central hole 40 (FIG. 6) in the rotating cooling platform 10 and a central hole 42 (FIG. 5) in the second gear 22. Such central hole 40 of the rotating cooling platform 10 and the central hole 42 in the second gear 22 being aligned and in coincidence with each other. The central shaft 38 traversing the central hole 40 and central hole 42 being located so that it can rotate freely and independently of the rotating cooling platform 10. A servomotor 44 connected to a second end or lower end 38B of the shaft 38 in such a manner that when servomotor 44 is programmed with a forward and backward movement, moves rack 28 and thereby the contact plate 32 and its respective fingers 36 to linearly push the containers with a diagonal path at a constant speed until are placed on conveyor belt A.

In a sequence of movements of the process for the transfer of articles (FIGS. 7 to 12), FIG. 7 shows the containers E that have been extracted by a takeout mechanism (not shown) from the blow molds (not shown) and place them in a first receiving area. In this position, the take-out mechanism leaves the containers E on the rotating cooling platform 10. The pusher mechanism 24 keeps the contact plate 32 and its respective fingers 36 retracted. Once the containers have been deposited on the rotating cooling platform 10, the contact plate 32 and its respective fingers 36 have a first forward movement to make contact with the containers.

Then, the rotating cooling platform 10 is rotated 90° (FIGS. 7 and 8), continuously transferring and cooling the containers E to a delivery area. It is important to note that due to the movement of the rotating cooling platform 10, the containers are not dragged (pushed) by the pusher mechanism 24, but are only accompanied in their path (pusher mechanism 24 also travels with the rotating cooling platform 10) until carried to a delivery area in front of a conveyor belt.

Subsequently, once the containers E are aligned with respect to a forward direction of the conveyor belt A, the pusher mechanism 24 (contact plate 32 and fingers 36), initiates a forward movement (FIG. 10) to linearly push the containers E with a diagonal path at constant speed of the rotating cooling platform 10 to the conveyor belt A, and place them in aligned form on it.

Once containers E have been transferred to the conveyor belt A, the contact plate 32 and fingers 36 have a backward movement (FIG. 11) and the rotating cooling platform 10 (FIG. 12) initiates a rotating movement, in the opposite direction, to position itself again in the first position or receiving area of the newly formed containers of the S-shaped sections (forming molds).

Even though a specific embodiment of a takeout mechanism has been described for the transfer of glassware, it will be evident to the experts in the field that many other features or improvements could be made, which can be considered within the field determined by the following claims.

I claim:

1. A system for transferring glass articles from glassware forming machines of the type comprising:
    a rotating cooling platform for receiving, cooling and transporting newly formed articles in molds from said forming machine, to a conveyor belt, said rotating cooling platform having a rotational movement to the left and right, from a first article receiving position to a second delivery position in front of that conveyor belt;
    first driving means located below the rotating cooling platform to rotate it rotate with said a rotational movement from such article receiving position to said second article delivery position and from such article delivery position to such article receiving position;
    a pushing mechanism coupled on the rotating cooling platform, said pushing mechanism being aligned in said first receiving position with each of the newly formed articles of the molds, said pushing mechanism being moved together with said rotating cooling platform from said first article receiving position to such second article delivery position, said pushing mechanism having a forward and backward movement in the second delivery position to push the articles with a diagonal path, at constant speed, from the rotating cooling platform positioned in this second position towards the conveyor belt to place the articles in an aligned manner thereon.

2. The system for transferring glass articles from glassware forming machines as claimed in claim 1, wherein the rotating cooling platform includes a series of orifices to discharge air; and, an air supply chamber coupled below the rotating cooling platform and in coincidence with a series of orifices, to continuously discharge cooling air through said orifices, for cooling the newly formed glassware.

3. The system for transferring glass articles from glassware forming machines as claimed in claim 2, wherein the series of orifices are distributed equidistantly.

4. The system for transferring glass articles from glassware forming machines as claimed in claim 2, wherein the cooling chamber is semi-circular.

5. The system for transferring glass articles from glassware forming machines as claimed in claim 2, wherein the cooling chamber is a plenum chamber.

6. The system for transferring glass articles from glassware forming machines as claimed in claim 1, wherein the first driving means located below the rotating cooling platform comprises:
    a first gear located below and near the periphery of the rotating cooling platform;
    an shaft that having a first end and a second end, said first end being connected to the first gear;
    wherein the driving means are connected to the second end of the shaft, to produce a rotational movement of the shaft to the left or right; and,
    a second gear coupled centrally below the rotating cooling platform, said second gear being engaged with the first gear, such that when the driving means are driven with a rotational movement to the left or right, the rotating cooling platform moves from the first position with respect to the newly formed articles of the forming sections to a second position with respect to the conveyor belt and vice versa.

7. The system for transferring glass articles from glassware forming machines as claimed in claim 1, wherein the first driving means is a servomotor.

8. The system for transferring glass articles from glassware forming machines as claimed in claim 1, wherein the pushing mechanism comprises:
    a support base;
    a rack-and-pinion assembly coupled on the support base, said rack including at one end a contact plate and a series of fingers extending from the front of said contact plate;
    a central shaft having a first end and a second end, said central shaft being connected by a first end to the pinion, said central shaft passing through a central hole in the rotating cooling platform, to rotate freely and independently of the rotating cooling platform; and,
    second driving means connected to the second end of the central shaft, said second driving means being programmed to move the rack with a forward and backward motion to linearly push the articles with a diagonal path of the rotating cooling platform positioned in said second position onto a conveyor belt to place the aligned articles on said conveyor belt.

9. The system for transferring glass articles from glassware forming machines as claimed in claim 8, wherein the second driving means is a servomotor.

10. A method for transferring glass articles from glassware forming machines of the type comprising:
    a) providing a rotating cooling platform for receiving, cooling and transporting at least one newly formed article from at least one forming mold;
    b) providing a pushing mechanism coupled to the rotating cooling platform;
    c) placing the newly formed articles in a first article receiving area on the rotating cooling platform;
    d) moving the rotating cooling platform and the pushing mechanism with a rotational movement from said first article receiving area to a second article delivery area;
    e) transferring the articles from the second article delivery zone by means of said pushing mechanism of the rotating cooling platform positioned in said second delivery zone from a zero speed until reaching a speed equal to and in the same direction as that of the conveyor belt, in order to place the articles on said conveyor belt;
    h) reversing the pushing mechanism once the items have been moved onto the conveyor belt; and,
    i) rotating the rotating cooling platform in the opposite direction, to return to the first article receiving area and start a new transfer cycle.

11. The method for transferring glass articles from glassware forming machines as claimed in claim 10, wherein the rotating cooling platform is rotated with an angle of 90°, moving to the left and to right.

12. The method for transferring of glass articles from glassware forming machines, as claimed in claim 10, wherein the articles are continuously cooled by the rotating cooling platform from the first article receiving area to the second article delivery area.

13. The method for transferring glass articles from glassware forming machines as claimed in claim 10, wherein the rotating cooling platform includes: providing a series of orifices on the surface of the cooling platform for the discharge of air; and, providing an air supply chamber coupled below the rotating cooling platform and in coincidence with the series of orifices, to continuously discharge cooling air through said orifices, for cooling the newly formed articles.

14. The method for transferring glass articles from glassware forming machines as claimed in claim 13, wherein the air supply chamber is semi-circular.

15. The method for transferring glass articles from glassware forming machines as claimed in claim 13, wherein the air supply chamber is a plenum chamber.

* * * * *

UNITED STATES PATENT AND TRADEMARK OFFICE
CERTIFICATE OF CORRECTION

PATENT NO. : 11,384,004 B2
APPLICATION NO. : 16/954690
DATED : July 12, 2022
INVENTOR(S) : Victor Tijerina Ramos Page 1 of 1

It is certified that error appears in the above-identified patent and that said Letters Patent is hereby corrected as shown below:

In the Claims

Column 8, Line 59, Claim 10, delete "h)" and insert -- f) --

Column 8, Line 61, Claim 10, delete "i)" and insert -- g) --

Signed and Sealed this
Fourth Day of October, 2022

Katherine Kelly Vidal
*Director of the United States Patent and Trademark Office*